UNITED STATES PATENT OFFICE.

CARL DREHER, OF NIEDER INGELHEIM, GERMANY, ASSIGNOR TO C. H. BOEHRINGER SOHN, OF SAME PLACE.

PROCESS OF MORDANTING.

SPECIFICATION forming part of Letters Patent No. 597,107, dated January 11, 1898.

Application filed October 29, 1896. Serial No. 610,400. (No specimens.)

*To all whom it may concern:*

Be it known that I, CARL DREHER, chemist, doctor of philosophy, residing at Nieder Ingelheim, on the Rhine, Germany, have invented new and useful Improvements in the Process of Mordanting, of which the following is a specification.

My invention relates to a process for mordanting vegetable fibers with tannin oxid of antimony and at the same time using calcium antimony lactate.

The study of the combination of lactic acid with antimony compounds has shown that a direct combination of lactic acid with oxid of antimony—that is, a lactate of antimony—will result and remain constant only in case a large excess of acid is present. This lactate is thus unsuited for mordanting fibers which have been prepared with tannin, as the tannic acid will precipitate on the fiber but a very small quantity of the oxid of antimony by reason of the very strong acid solution. Double salts of antimony lactate, with alkali and earth-alkali lactates, as obtained by the process hereinafter described, are more suitable for this use, while others produced by mixing chlorid of antimony with alkalies or earth alkalies are practically unavailable for this use, as considerable acid must remain in solution.

A double lactate of antimony, which is very well adapted for mordanting without the addition of acid, as under ordinary conditions it precipitates all antimony in the tannic acid or on the fiber, is obtained as follows: One molecule of oxid of antimony is mixed with two molecules of acid lactate of calcium while heated. A clear solution of salt of antimony will result. A white crystalline mass will be obtained by evaporating the solution, which, however, is very hygroscopic and cannot, therefore, be obtained practically in a stable condition with an admixture of antimony. For this reason, therefore, an unchangeable concentrated solution is better adapted for the purpose of mordanting.

As illustrating the capabilities of my invention I will state that 2.5 liters of the above antimony calcium lactate containing one hundred and twenty grams of antimony oxid to the liter may be employed in mordanting one hundred kilos of cotton which have been treated in advance with five per cent. of tannin in the usual manner, which solution will be as effective in treating the cotton as a solution of 2.5 kilos tartar emetic containing forty-three per cent. of oxid of antimony or a solution of 2.5 kilos fluorate of antimony sulfate of ammonium containing forty-six per cent. of oxid of antimony would be in treating the same cotton.

After treating the cotton with the antimony-calcium-lactate mordant just described the analysis of the remaining mordant (antimony baths) will show that no traces of antimony oxid remain in the antimony-calcium-lactate bath—that is, all antimony has been used up—while the tartar-emetic bath referred to, if used, will still contain twenty-eight per cent. of the antimony oxid used, and the fluorate-of-antimony-sulfate-of-ammonium bath, if used, will still contain twenty-two per cent. of the antimony oxid used. This result is to be attributed to the fact that in the use of antimony calcium lactate acid calcium lactate is formed by the removal of antimony oxid by the tannic acid, which acid calcium lactate is unable to dissolve the tannic antimony oxid, while in the other cases free acids are formed, which partly prevent the formation of tannic antimony oxid or dissolve the latter again.

The foregoing new mordanting process results in practice in a valuable saving of antimony, as hitherto considerable antimony was lost on account of the inability of exhausting the antimony from the baths.

What I claim, and desire to secure by Letters Patent, is—

1. The herein-described process of producing a mordant which consists in forming a bath of antimony oxid and acid calcium lactate, thereby obtaining an antimony-calcium-lactate bath from which the antimony oxid will be completely exhausted during the process of mordanting.

2. The herein-described process of dyeing, which consists in treating fibers with tannin substances, and thereupon mordanting the same by treating the same with antimony calcium lactate in a bath, substantially as described.

3. An improved mordant for dyeing and analogous operations, consisting of antimony oxid combined with acid lactate of calcium.

In testimony whereof I have signed my name to this specification in the presence of two subscribing witnesses.

CARL DREHER.

Witnesses:
RICHARD WIRTH,
EVA SATTLER.